United States Patent [19]

Kennedy

[11] 4,115,301
[45] Sep. 19, 1978

[54] CROSS-LINKER FOR FLEXIBLE AND SEMI-FLEXIBLE POLYURETHANE FOAMS

[75] Inventor: William Alvis Kennedy, Houston, Tex.

[73] Assignee: Texaco Development Corp., New York, N.Y.

[21] Appl. No.: 757,254

[22] Filed: Jan. 6, 1977

Related U.S. Application Data

[60] Division of Ser. No. 546,460, Feb. 3, 1975, abandoned, which is a continuation-in-part of Ser. No. 398,179, Sep. 17, 1973, abandoned.

[51] Int. Cl.$^2$ ............................ C08G 18/32; C08J 9/06
[52] U.S. Cl. .................................... 521/155; 252/182; 528/367; 260/453 A
[58] Field of Search ................. 252/182; 260/2.5 AM, 260/77.5 AM, 453 A

[56] References Cited

U.S. PATENT DOCUMENTS

| 3,362,979 | 1/1968 | Bentley | 260/453 A |
| 3,517,062 | 6/1970 | Powers | 260/453 A |
| 3,580,869 | 5/1971 | Rhodes et al. | 260/2.5 AM |

*Primary Examiner*—Benjamin R. Padgett
*Assistant Examiner*—Irwin Gluck
*Attorney, Agent, or Firm*—James L. Bailey; Kenneth R. Priem

[57] ABSTRACT

Novel flexible and semi-flexible polyurethane foams having good hardness properties and superior resistance to permanent set are disclosed. The novel foams are produced by reacting an organic polyisocyanate with a polyether polyol and employing as a cross-linker an effective amount of a polymethylene polyphenylamine having a functionality of from about 2.2 to about 2.7 having a specific isomeric distribution. The cross-linker is easy to handle and is compatible with urethane foam systems.

5 Claims, No Drawings

CROSS-LINKER FOR FLEXIBLE AND SEMI-FLEXIBLE POLYURETHANE FOAMS

CROSS REFERENCES TO RELATED APPLICATIONS

This is a division of application Ser. No. 546,460, filed Feb. 3, 1975, now abandoned, which is a continuation-in-part of application Ser. No. 398,179 filed Sept. 17, 1973, now abandoned.

BACKGROUND OF THE INVENTION

In producing flexible and semiflexible polyurethane foams having certain desired properties, it is often advantageous to employ a cross-linker. Many such cross-linkers have been used. The most widely used cross-linker in recent times has been 4,4'-methylene-bis-ortho-chloroaniline and mixtures containing such materials. Unfortunately, in pure form this material is a solid at convenient operating temperatures and thus is difficult to handle. The mixed materials containing this chlorinated aromatic amine cross-linker are also solids at room temperature and have been found to change with respect to their reactions in polyurethane compositions.

Recently methylene dianiline (MDA) has been tried as a replacement. While methylene dianiline gives many of the desirable properties of 4,4'-methylene-bis-ortho-chloroaniline, it is highly reactive, and additionally has a high melting point which makes it also difficult to handle when operating on a commercial scale. Prior art amine cross-linkers, including the above, are disclosed and discussed in U.S. Pat. Nos. 3,523,918 and 3,961,265, for example. However, these prior art cross-linkers have been deficient in some manner for use in polyurethane formulation, particularly for improving hardness of flexible foams. In addition, polyurethane foams using methylene dianiline cross-linkers have proved inferior to certain applications such as automobile crash pads, arm rests and packing materials because of their relatively low resistance to compressive set. Thus such foams are subject to excessive deformation upon extended use.

Cross-linkers of polymethylene polyphenylamine having a functionality of greater than 2.0 and being essentially 4,4'-isomer have also been used as cross-linkers. This cross-linker also proved hard to handle being extremely difficult to liquefy. Additionally, the freeze-thaw characteristics of this cross-linking material were found to be such that after several such cycles the performance in the polyurethane reaction varied appreciably. Further, the foams produced using these cross-linkers, while harder than comparable foams produced with MDA, still lacked suitable resistance to compressive set.

Surprisingly it has now been discovered that polymethylene polyphenylamine mixtures having an average functionality of from 2.2 to about 2.9 and having a methylene dianiline isomeric distribution of from about 10 to about 70 wt.% 2,4'-isomer, from about 1 to about 20 wt.% 2,2'-isomer, with the remaining methylene dianiline being 4,4'-isomer are extremely easy to handle and compatible with flexible or semi-flexible polyurethane foam formulations.

Additionally the above described mixtures have desirable freeze-thaw characteristics such that their performance in the polyurethane reaction does not vary even after several such cycles. Foams formulated using the polymethylene polyphenylamine mixture show improved hardness over foams formulated with MDA as well as superior resistance to deformation over foams formulated with a polymethylene polyphenlamine of substantially the 4,4'-isomer.

SUMMARY OF THE INVENTION

In accordance with the broad aspects of the invention a novel polymethylene polyphenylamine mixture having a functionality of from about 2.2 to about 2.7 and having a methylene dianiline isomeric distribution of from about 10 to about 70 wt.% 2,4'-isomer, from about 1 to about 20 wt.% 2,2'-isomer with the remainder being substantially the 4,4'-isomer is utilized as a cross-linker in formation of flexible and semi-flexible polyurethane foams.

According to one aspect of the invention flexible and semi-flexible polyurethane foams are produced by reacting an organic polyisocyanate with a polyether polyol and an effective amount of the novel polymethylene polyphenylamine cross-linker.

DESCRIPTION OF A PREFERRED EMBODIMENT

In order to improve the properties, particularly hardness and deformation resistance of flexible and semi-flexible polyurethane foams, including the highly resilient foams, prepared by reacting an organic polyisocyanate with polyether polyols, a polymethylene polyphenylamine mixture is used which has a functionality of from about 2.2 to about 2.9, preferably 2.2 to about 2.7, and wherein the methylene dianiline portion of said amine mixture has an isomeric distribution of from about 10 to about 70 wt.% 2,4'-isomer, from about 1 to about 20 wt.% 2,2'-isomer with the remaining methylene dianiline being 4,4'-isomer. To illustrate, the amine cross-linkers of this invention may be characterized by the following structure:

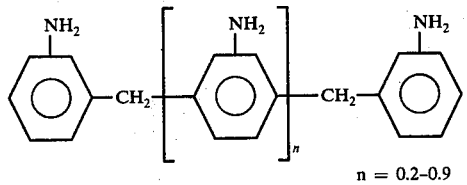

n = 0.2–0.9

The above described isomers of the amine mixture may be characterized by the following structural representation:

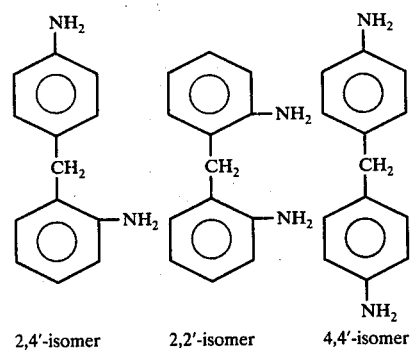

2,4'-isomer    2,2'-isomer    4,4'-isomer

Such compounds are made by the reaction of aniline with formaldehyde. The amine cross-linker is the same as the amine precursor for the isocyanate products d scribed in U.S. Pat. No. 3,362,979. The disclosure of said patent is incorporated herein by reference and gives a description of the process by which the amine products useful in the practice of tis invention are produced and explains the parameters to be varied in order to control the functionality and isomer distribution of the methylene dianiline.

In the practice of my invention, the amine cross-linker is added in an effective amount to yield foams of the desired properties. Preferably the amine cross-linker is added in amounts of from about 0.8 parts by weight to about 2.5 parts by weight per 100 parts of polyether polyol used in the polyurethane reaction. The especially preferred amounts are from about 1.0 to about 2.0 parts by weight per 100 parts of polyol.

It has been discovered that the above polymethylene polyphenylamines, while not excessively reactive, do react with the organic polyisocyanate and polyether polyol reaction products at a somewhat faster rate than 4,4'-methylene-bis-ortho-chloroaniline and, surprisingly, produce flexible foams with improved hardness and resistance to permanent deformation. Further, the polymethylene polyphenylamines having the above discussed functionality and isomeric distribution are generally liquids and easy to handle at ordinary operating temperatures for the polyurethane reaction, whereas, 4,4'-methylene-bis-ortho-chloraniline, methylene dianiline, and polymethylene polyphenylamines of substantially the 4,4'-isomer require substantial heating to liquefy them in order to incorporate them into a polyurethane formulation. Further the repetitive heating of the materials has been found to cause some of these prior art amine cross-linkers to change in the nature of the way they react.

The polymethylene polyphenylamines having the above discussed functionality and isomeric distribution in the diamine portion exhibit outstanding freeze-thaw characteristics and a consistency of reactivity even though having been repeatedly heated and frozen. To demonstrate this a polymethylene polyphenylamine having an average functionality of about 2.3 and an isomer distribution in the diamine portion of about 3% by weight of the 2,2'-isomer, about 22 wt.% of the 2,4'-isomer, and correspondingly about 75 wt.% of the 4,4'-isomer was frozen at −78° C and then heated to +70° C and held at these respective temperatures for several hours for five repetitions. The times of each cycle are shown in the following table.

| Cycle | Time, hr. | | | | |
|---|---|---|---|---|---|
| | 1 | 2 | 3 | 4 | 5 |
| −78° C | 16 | 12 | 18 | 24 | 96 |
| +70° C | 13.5 | 25 | 48 | 48 | 110* |

*Approximate

After this testing a sample of this amine was used as a cross-linker in a polyurethane formulation and compared with the polyurethane formulation using a sample of the same amine which had not been run through the freeze-thaw cycle. The cycled amine showed no difference in reactivity and the foam properties were the same when compared with the controlled sample which had not been recycled.

Thus the use of the amine cross-linker of my invention having a functionality of about 2.2 to 2.9 and an isomer distribution in the diamine portion of from about 1 to abut 10% by wt. of 2,2'-isomer and from about 20 to about 70 wt.% of the 2,4'-isomer, with the remaining isomer being the 4,4'-isomer, is unexpectantly stable in the production of polyurethane materials.

As mentioned above, the amine cross-linkers of my invention used to produce the flexible or semi-flexible polyether polyurethane foams of my invention are reacted with organic polyisocyanates in conjunction with polyether polyols to form polyurethane foams.

The polyether polyols useful in the practice of my invention are those triols, tetrols and mixtures thereof having a molecular weight of from about 2,500 to about 8,000. Further, polyether diols may be used in admixture with said higher functionality materials. The diols are generally polyalkylene ether glycols such as polypropylene ether glycol, polybutylene ether glycol, and the like, and mixtures thereof. Mixed polyether polyols can also be used such as the condensation products of an alkylene oxide with a polyhydric alcohol having three or four hydroxyl groups such as glycerol, trimethylolpropane, 1,2,6-hexanetriol, pentaerythritol, and the like. These polyether polyols are well known and may be prepared by any known process such as, for example, the processes discussed in Encyclopedia of Chemical Technology, volume 7, pages 257–262, published by Interscience Publishers, Inc. in 1951.

As mentioned above, any suitable polyhydric polyalkylene ether may be used, such as, for example, the condensation product of an alkylene oxide with a polyhydric alcohol. Any suitable polyhydric alcohol may be used such as, for example, ethylene glycol, 1,2-propylene glycol, 1,3-propylene glycol, 1,4-butylene glycol, 1,3-butylene glycol, glycerine, trimethylolpropane, 1,2,6-hexanetriol, pentaerythritol, and the like. Any suitable alkylene oxide may be used such as, for example, ethylene oxide, propylene oxide, butylene oxide, amylene oxide, their various isomers, and the like. Of course the polyhydric polyalkylene ether polyols can be prepared from other starting materials such as, for example, tetrahydrofuran, epihalohydrin, aralkylene oxides such as, for example, styrene oxide, and the like. Polyhydric polyether polyols having three or four hydroxyl groups per molecule and a molecular weight of from about 2,500 to about 8,000 can be used. The polyol used can be a blend of diols with triols or tetrols to produce a polyol blend having an average molecular weight of from about 3,500 to about 8,000. Diols which are useful in the blend would have a molecular weight of from about 1,000 to about 4,000.

The polyether polyols may have primary or secondary hydroxyl group termination. When the polyhydric alcohol is reacted with an alkylene oxide such as propylene oxide, butylene oxide, and the like, the terminal groups are predominantly secondary hydroxyl groups. Preferably, the polyether polyols have from about 75 to about 85% primary hydroxyl termination, and more preferably from about 75 to about 80%. These polyether polyols are preferably produced by reacting ethylene oxide with the polyether in a final alkoxylation step by the known alkoxylation processes in order to increase the terminal primary hydroxyl content of the said polyether polyol. The manufacture of ethylene oxide "tipped" polyether polyols is generally discussed in U.S. Pat. No. 3,336,242.

The organic polyisocyanate reacts directly with the active hydrogen atoms of the polyether polyol and the amine cross-linker. The organic isocyanate may be difunctional such as toluene diisocyanate or an organic isocyanate of higher functionality such as polymethylenepolyphenylisocyanate. The higher functionality isocyanate containing material is preferred. Preferred polyisocyanates are produced by the phosgenation of the reaction product of aniline and formaldehyde. Such reactions are well known and described in U.S. Pat. Nos. 2,683,730; 3,277,173; 3,344,162 and 3,362,979 for example. The organic isocyanates thus formed have functionalities greater than two which can be varied up to high functionality materials. The product is usually a mixture of high functionality material with the diisocyanate resulting in an average functionality. It is this average that is referred to as the functionality of the isocyanate. It is preferred that the functionality be about from 2.0 to about 3.3 and especially preferred that the functionality of the polymethylene polyphenylisocyanate used in practice of this invention be from about 2.2 to about 2.9. Other organic isocyanates are described in U.S. Pat. No. 3,194,773, for example.

The above described organic polyisocyanates and polyether polyols are reacted in amounts such that the isocyanate index or the ratio of free isocyanate groups to the sum of the free hydroxyl and amine groups in the formulation are from about 0.9 to about 1.1 and it is particularly preferred that the said isocyanate index be about 1.0.

In the production of flexible polyurethane foams in the practice of this invention, other known additives are necessary. One such constituent is the blowing agent. Some examples of well known blowing agents are water, methylene chloride, trichloromonofluoromethane, dichlorodifluoromethane, 1,1-dichloro-1-fluoromethane, 1,1-difluoro-1,2,2-trichloromethane, chloropentafluoroethane, 1,2-dichloro-1,1,2,2-tetrafluoroethane, and the like.

Many catalysts of urethane formation are useful in the practice of my invention. Such catalysts, which either may be used alone or in combination with other catalysts, are, for example, dimethylaminoethanol, tetramethyl1,3-propanediamine, triethylenediamine, etramethyl-1,2-butanediamine, dimethylcyclohexylamine, methyltriethylenediamine, N-methylmorpholine, N-ethylmorpholine, and the like. There are many tertiary amine catalysts which are useful and well known to those killed in the art both as to the preparation which should be used and the catalyst compounds themselves.

Another class of useful polyurethane catalyst are organo-metallic catalysts including, for example, organo-tin, mercury, lead, bismuth and arsenic compounds. Specifically, these other suitable catalysts include arsenic trichloride, antimony trichloride, antimony pentachloride, antimony tributoxide, bismuth trichloride, titanium tetrachloride, bis(cyclopentadienyl) titanium diflouride, titanium chelates such as octylene glycol titanate, dioctyl lead dichloride, dioctyl lead diacetate, dioctyl lead oxide, trioctyl lead chloride, trioctyl lead hydroxide, trioctyl lead acetate, dibutyl tin dilaurate, stannous octoate, copper chelates such as copper acetylacetonate and mercury salts. Particularly useful organo tin catalysts are described in U.S. Pat. No. 3,194,773 for example.

Either class of catalyst can be used, either alone or as a catalyst blend and is generally employed in catalytic amounts such as from about 0.1 wt. percent to about 6 wt. percent based upon the weight of teh polyether polyol employed.

Surfactant agents, better known as silicone oils, may, optionally, be added to serve as cell stabilizers. Some representative materials are well known and sold under the name of SF-96(5), from General Electric Co., DC-200 from Dow-Corning, L-5303 and L-5305 from Union Carbide. Filled foams generally do not require a cell stabilizer.

Should fire retardance be desired or required for the flexible or semi-flexible polyurethane foam, two types of fire retardants are available; those that are incorporated by mere mechanical mixing and those that become chemically bound in the polymer chain. Representative of the first type are tris(chloroethyl) phosphate, tris(2,3-dibromopropyl) phosphate, diammonium phosphate, various halogenated compounds and antimony oxide. Representative of the chemically bound type are chlorendic acid derivatives, and various phosphorus containing polyols.

In the one shot method of preparing polyurethane foams, all of the components are mixed together at once and the reaction occurs in one step. Though not preferred for the practice of my invention, the prepolymer method may be used where a portion of the polyether polyol is initially reacted with the isocyanate to form a so-called prepolymer having an excess of free, or unreacted, isocyanate groups. When foam is desired the rest of the polyol and the other ingredients, including the amine cross-linkers of my invention, are added to this prepolymer and the foam is formed. Both methods have advantages and drawbacks and it is within the understanding of one skilled in the art to select the method most desirable under specific circumstances.

My invention will be further illustrated by reference to the following specific examples which are given by way of illustration rather than by way of limitation on the scope of this invention.

EXAMPLE I

The ingredients of the polyurethane formulations in amounts set forth in Table I were mixed and poured into a 12 × 12 × 1 inch aluminum mold treated with a release agent and allowed to foam in the closed mold to produce a molded flexible polyurethane foam. The cured foam was then tested for its physical properties and the results of said test are set forth in Table I.

TABLE I

| Formulation, pbw | A | B |
|---|---|---|
| Polyol (1) | 100 | 100 |
| Fluorocarbon-11 Blowing Agent | 6.0 | 6.0 |
| #1 White Calcium Carbonate | 80.0 | 80.0 |
| Dimethylcyclohexylamine | 1.0 | 1.0 |
| Water | 2.0 | 2.0 |
| Dibutyltin dilaurate | 0.5 | 0.5 |
| Amine cross-linker | | |
| Functionality (f) 2.2 (2) | 1.5 | — |
| Amine cross-linker f=2.7 (2) | — | 1.5 |
| Polymeric isocyanate (f=2.8) | 39.5 | 39.5 |
| Isocyanate Index | 1.0 | 1.0 |
| Cream time, sec. | 6 | 6 |
| Rise time, sec. | 53 | 55 |
| Pour time, sec. | 2.5 | 2.5 |
| Physical Properties | | |
| 25% CLD value, (1 inch sample including skin) | 1.13 | 1.05 |
| Density, pcf (1 inch molded sample) | 8.3 | 8.7 |
| Tensile, psi. | 7.8 | 7.5 |
| Tear, pli. | .5 | .4 |
| Elongation, % | 35 | 53 |
| 50% Compression set | 15.4 | 11.2 |
| Humid Aging Properties | | |
| 50% Compression set (5 hrs., 250° F) | 25.1 | 22.0 |

(1) A 5,500 molecular weight polyoxypropylene/polyoxyethylene adduct of trimethylolpropane with about 70% primary hydroxyl content.
(2) The methylene dianiline portion contained about 3 wt. % 2,2'-isomer, about 22 wt. % 2,4'-isomer and about 75 wt. % of the 4,4'-isomer.

EXAMPLES II AND III

Following the procedures set forth in Example I, molded polyurethane foams were produced to compare results using the amine cross-linker of this invention (Table II) with results using methylene dianiline (Table III).

TABLE II

| Formulation, pbw | C | D | E |
|---|---|---|---|
| Polyol (Example I) | 100 | 100 | 100 |
| #1 White Calcium Carbonate | 80 | 80 | 80 |
| Fluorocarbon-11 | 6.0 | 6.0 | 6.0 |
| Dimethylcyclohexylamine | 1.0 | 1.0 | 1.0 |
| Water | 2.0 | 2.0 | 2.0 |
| Dibutyltin dilaurate | .5 | .5 | .5 |
| Amine cross-linker, functionality 2.7 (1) | 1.5 | 1.5 | 1.5 |
| Polymethylene polyphenyl isocyanate (f=2.8) | 38.0 | 38.0 | 41.8 |
| Isocyanate Index | 1.0 | 1.0 | 1.1 |
| Processing Conditions | | | |
| Polyol temp., °F | 80 | 80 | 80 |
| Isocyanate temp., °F | 80 | 80 | 80 |
| Mold temp., °F | 110 | 110 | 110 |
| Pour time, seconds | 2.5 | 2.6 | 2.5 |
| Cream time, seconds | 6 | 6 | 6 |
| Rise time, seconds | 55 | 55 | 55 |
| Physical Properties | | | |
| 25% CLD value (1-inch sample including skin) | 1.05 | 1.68 | 1.73 |
| Density, pcf (1-inch molded sample) | 8.8 | 9.2 | 8.5 |
| Tensile, psi | 7.5 | 12.1 | 11.2 |
| Tear, pli | .40 | .57 | .57 |
| Elongation, % | 53 | 47 | 33 |
| 50% Compression set | 11.2 | 9.7 | 10.1 |
| Humid Aging Properties | | | |
| 50% Compression set (5 hrs., 250° F) | 22.0 | 14.5 | 14.5 |

(1) See Table I for isomer distribution.

TABLE III

| Formulation, pbw | F | G | H |
|---|---|---|---|
| Polyol (Example I) | 100 | 100 | 100 |
| #1 White Calcium Carbonate | 80 | 80 | 80 |
| Fluorocarbon-11 | 6.0 | 6.0 | 6.0 |
| Dimethylcyclohexylamine | 1.0 | 1.0 | 1.0 |
| Water | 2.0 | 2.0 | 2.0 |
| Dibutyltin dilaurate | .5 | .5 | .5 |
| Methylene dianiline | 1.5 | 1.5 | 1.5 |
| Polymethylene polyphenyl isocyanate (f=2.8) | 34.2 | 38.0 | 41.2 |
| Isocyanate Index | .9 | 1.0 | 1.1 |
| Processing Conditions | | | |
| Polyol temp., °F | 80 | 80 | 80 |
| Isocyanate temp., °F | 80 | 80 | 80 |
| Mold temp., °F | 110 | 110 | 110 |
| Pour time, seconds | 2.2 | 2.2 | 2.2 |
| Cream time, seconds | 6 | 6 | 6 |
| Rise time, seconds | 55 | 55 | 55 |
| Physical Properties | | | |
| 25% CLD value (1-inch sample including skin) | .74 | .78 | 1.16 |
| Density, pcf (1-inch molded sample) | 7.2 | 7.3 | 7.4 |
| Tensile, psi | 8.6 | 7.2 | 11.0 |
| Tear, pli | .32 | .47 | .48 |
| Elongation, % | 53 | 58 | 53 |
| 50% Compression set | 11.4 | 12.2 | 9.7 |
| Humid Aging Properties | | | |
| 50% Compression set (5 hrs., 250°0 F) | 16.9 | 14.4 | 18.7 |

A comparison of runs on Tables II and III having the same isocyanate index can be made, i.e., Runs C and D with prior art Run G and Run E with Run H. It will be noted that the molded polyurethane foams of this invention are harder than the comparable foams made from MDA as exemplified by the 25% CLD values.

EXAMPLES IV AND V

Following the procuedures set forth in Example I, molded polyurethane foams were produced to compare the results usng the amine cross-linker of the instant invention (Column I) with results using a polymethylene polyphenylamine having functionality of greater than 2.0 and being essentially the 4,4'-isomer (Column J). The results are set out in Table IV below.

TABLE IV

| Formulation, pbw | I | J |
|---|---|---|
| Polyol (Example I | 100 | 100 |
| #1 White Calcium Carbonate | 80 | 80 |
| Fluorocarbon-11 | 6.0 | 6.0 |
| Dimethylcyclohexylamine | 1.0 | 1.0 |
| Water | 2.0 | 2.0 |
| Dibutyltin dilaurate | | |
| Polyphenyl polyamine 4,4'-isomer (f=2.3) (1) | — | 1.5 |
| Polyphenyl polyamine (f=2.3) (2) | 1.5 | — |
| Polymethylene polyphenyl isocyanate (f=2.8) | 39.21 | 39.30 |
| Isocyanate Index | 1.0 | 1.0 |
| Processing Conditions | | |
| Polyol temp., °F | 80 | 80 |
| Isocyanate temp., °F | 80 | 80 |
| Mold temp., °F | 110 | 110 |
| Pour time, seconds | 4.9 | 5 |
| Rise time, seconds | 65 | 60 |
| Physical Properties | | |
| 25% CLD value (1-inch sample including skin) | 1.8 | 2.1 |
| Density, pcf (1-inch molded sample) | 10.0 | 10.0 |
| Tensile, psi | 12.1 | 11.8 |
| Tear, pli | .55 | .61 |
| Elongation, % | 47.5 | 43 |
| 50% Compression set | 9.5 | 11.6 |
| Humid Aging Properties | | |
| 50% Compression set (5 hrs., 250° F) | 12.1 | 12.7 |

(1) Polyphenyl polyamine which is substantially the 4,4'-isomer (equivalent wt. 103, functionality 2.3).
(2) See Table I for isomer distribution.

As can be seen by a comparison of column I and J, the resistance to compression set is substantially greater with the foam produced with the cross-linker of the instant invention. In addition, in preparing the polyurethane foam shown in cloumn J, it was found that the cross-linkr material which is normally solid at room temperature was extremely difficult to handle. Specifically, this material had to be heated at temperatures of about 100° C in order to obtain a liquid. After liquefaction, the material had to be reblended. The material resolidified upon being cooled.

While the invention has been explained in relation to its preferred embodiment, it is to be understood that various modifications thereof will become apparent to those skilled in the art upon reading the specification and is intended to cover such modifications as fall within the scope of the appended claims.

What is claimed is:

1. A polyurethane foam composition consisting essentially of:

a polyether polyol which has been reacted with an organic polyisocyanate in the presence of blowing agent and from about 0.8 parts to about 2.5 parts by weight per 100 parts by weight of said polyether polyol of a polymethylene polyphenyl amine mixture having an average functionality of from about 2.2 to about 2.9 wherein the methylene dianiline portion of said amine mixture has an isomeric distribution of from about 10 to 70 weight percent 2,4'-isomer, from about 1 to 20 weight percent 2,2'-isomer, with the remaining methylene dianiline being the 4,4'-isomer.

2. The polyurethane foam composition of claim 1 wherein the ratio of isocyanate groups to the sum of the hydroxyl groups, and amine groups is from about 0.9 to about 1.1.

3. The polyurethane composition of claim 2 wherein said polymethylene polyphenyl amine mixture is present in an amount from about 1.0 to about 2.0 parts by weight per 100 parts of said olyether polyol.

4. The polyurethane composition of claim 1 wherein the polyether polyol has an average molecular weight of from about 3,500 to about 8,000 and is selected from a group consisting of polyether diols, poletber triols, polyether tetrols, and mixtures thereof.

5. A polyurethane foam composition prepared by admixing and reacting a polymethylene polyphenyl isocyanate with a polyether polyol having a molecular weight from 3,500 to 8,000 in the presence of a fluorocarbon blowing agent, an effective amount of water, an effective amount of tertiary amine catalyst, an effective amount of an organo-metallic catalyst, and a cross linking agent consisting essentially of a polymethylene polyphenyl amine mixture having an average functionality of from about 2.2 to about 2.4 wherein the methylene dianiline portion of said amine mixture has an isomeric distribution of from about 15 to 30 weight percent 2,4'-isomer, from about 1 to 5 weight percent 2,2'-isomer, with the remaining methylene dianiline being substantially the 4,4'-isomer wherein the ratio of isocyanate group to the sum of the hydroxyl group and the amine groups is from about 0.9 to about 1.1 and wherein said polymethylene polyphenyl amine mixture is present in amounts from about 1.0 to about 2.0 parts by weight per 100 parts of said polyether polyol.

* * * * *